Patented Aug. 29, 1933

1,924,180

UNITED STATES PATENT OFFICE 1,924,180

SOLID FUEL

Sandford S. Cole, Pittsburgh, Pa., assignor to The Koppers Company of Delaware, a Corporation of Delaware No Drawing. Application July 8, 1929
Serial No. 376,866

1 Claim. (Cl. 44—6)

This invention relates to a process of treating coal, coke or semi-coke and a product resulting from such treatment and more particularly to the production of a non-clinkering fuel.

An object of the present invention is to provide means for raising the fusing temperature of ash in solid carbonaceous fuels.

From careful studies of coal, the changes which coal ash undergoes upon combustion of the coal have been quite definitely determined. Coal ash comprises several minerals including quartz, kaolinite, hydromica, pyrite, siderite, felspars and micas. These occur often as nodules of varying sizes and certain of them such as pyrite, felspars and micas have relatively low melting points as compared with quartz or kaolinite. These minerals more often appear as thin layers and may be entirely occluded by the coal substance.

It is believed that clinker formation proceeds through several stages, the initial stage being that of melting of the low fusion portions of the mineral matter in coal, forming glassy globules. These globules may coalesce and form larger globules which may surround solid particles of mineral matter. This solid mineral matter of higher melting temperature on coming into contact with the glassy matter may form a very low eutectic and the entire mass may merge forming a still larger globule to which coal and unfused ash are likely to adhere. In certain coals such as Kittanning seam this action appears to be quite prevalent. As the resulting mass passes down into the colder portions of the fuel bed, it solidifies or it adheres to other masses which have previously solidified.

In accordance with the present invention, substances are added to coal to prevent the above changes. The substances added are such as will form a very high viscosity glass with molten mineral matter, and this glass is not likely to adhere to the solid particles of mineral matter of higher melting temperature referred to above. The formation of a high viscosity glass may be only a surface reaction, particularly when the substance added covers a relatively large piece of fused mineral matter. This viscous coating is adequate to prevent the conglomeration of several globules of molten mineral matter. The particles will not adhere together firmly, and the slightest movement of the fuel bed will separate them.

To obtain a fuel which will produce an ash having the above characteristics, I add to coal, coke, or semi-coke or any solid carbonaceous fuel, a refractory material, for example, a highly aluminous material such as bauxite, diaspore, gibbsite or other hydrated aluminum oxides preferably containing from 70% to 80% aluminum oxide after calcination and about 10% aluminum silicate preferably hydrated. In particular, the aluminous material in the form of dust is converted into a slurry by the addition of slurry-forming materials. Such means as oils and deliquescent salts in water solution or emulsions are suitable for this purpose and help to retain the dust on the surface of the coal.

An emulsion of oil, and water, is prepared and the aluminous material in the form of fine particles is suspended therein. Various emulsifying oils may be used, for example, petroleum oils, tars and tar oils, vegetable and animal oils, etc. Instead of an emulsion of oil and water, a solution of deliquescent substances such as calcium chloride or calcium nitrate may be used or organic substances such as glycerine, glucose, waste sulfite liquor, etc. If desired, a deliquescent substance may be added to the emulsion of water and oil. Powdered coal may be added to any of these mixtures to produce a product which will be the same color as the fuel treated. Any other dark staining material such as humic acid may be substituted for powdered coal.

In certain cases, a slurry may be prepared merely by suspending the aluminous material in water. Also, a mere suspension of aluminous material in oil may be used or a mixture of aluminous material and deliquescent salt may be used.

By way of example, a suitable composition for coating coal may be prepared by mixing together equal parts by weight of bauxite and an emulsion containing about 3 to 5% of oil, or by mixing equal parts by weight of bauxite and a solution of calcium chloride of about 10% concentration.

The above compositions are evenly applied over the surface of the coal by spraying or otherwise. In general, the use of bauxite for instance in proportions of 1 to 2% of the weight of coal will increase the fusing temperature of the ash as much as 500° F. I have found that the addition of 25% bauxite based on the weight of the ash will produce a non-clinkering ash in many coals which would otherwise be unsuitable for most commercial uses.

Lower Kittanning seam coal mined in Pennsylvania, and having 8.5% ash with a fusing temperature of 2450° F. when treated with 2% bauxite was found to yield an ash having a fusing temperature of 2720° F. In the case of Elkhorn seam coal mined in Kentucky having 3.65% ash, the fusing temperature was raised from 2140° F. to 2350° F. by the addition of .9% of bauxite.

The use of the above described aluminous materials results in the prevention of clinker formation and permits higher temperatures in boiler operation. By applying these materials in the form of slurries, the formation of dust is prevented and they are retained in place until the fuel is burned. The application of other refractory oxides such as calcium oxide, hydroxide or the like, chromium oxide, magnesium oxide or similar materials which may be employed to increase the fusing temperature of coal ash, or prevent clinker formation, is carried out in the same manner as that described above with respect to aluminous materials.

I claim as my invention:

Solid fuel having on its surface a film of a composition consisting of oil and hydrated aluminum oxide, the said hydrated aluminum oxide being present to the extent of up to substantially two percent by weight of the said solid fuel.

SANDFORD S. COLE.